April 6, 1943.   W. J. PHANEUF   2,315,982
CIRCULAR BROACHING CUTTER
Filed April 28, 1941

Inventor
Wilrose J. Phaneuf
By attorney

UNITED STATES PATENT OFFICE 2,315,982

CIRCULAR BROACHING CUTTER

Wilrose J. Phaneuf, Hudson, Mass., assignor to The Lapointe Machine Tool Company, Hudson, Mass., a corporation of Maine Application April 28, 1941, Serial No. 390,691

1 Claim. (Cl. 29—95.1)

This invention relates to a circular broaching cutter particularly designed to produce external grooves, splines or ribs in a metal surface of revolution, such as the hub of a gear or sprocket.

It is the general object of my invention to provide a broaching cutter by which a series of cuts of substantially the same base outline but of progressively greater depth may be cut in a piece of metal.

In the preferred form, these cuts are made progressively by reciprocated cutting teeth having the same base width and base angles but increasing in tooth height in the order of cutting.

My invention further relates to arrangements and combinations of parts which will be hereinafter described and more particularly pointed out in the appended claim.

A preferred form of the invention is shown in the drawing, in which

Figure 1:
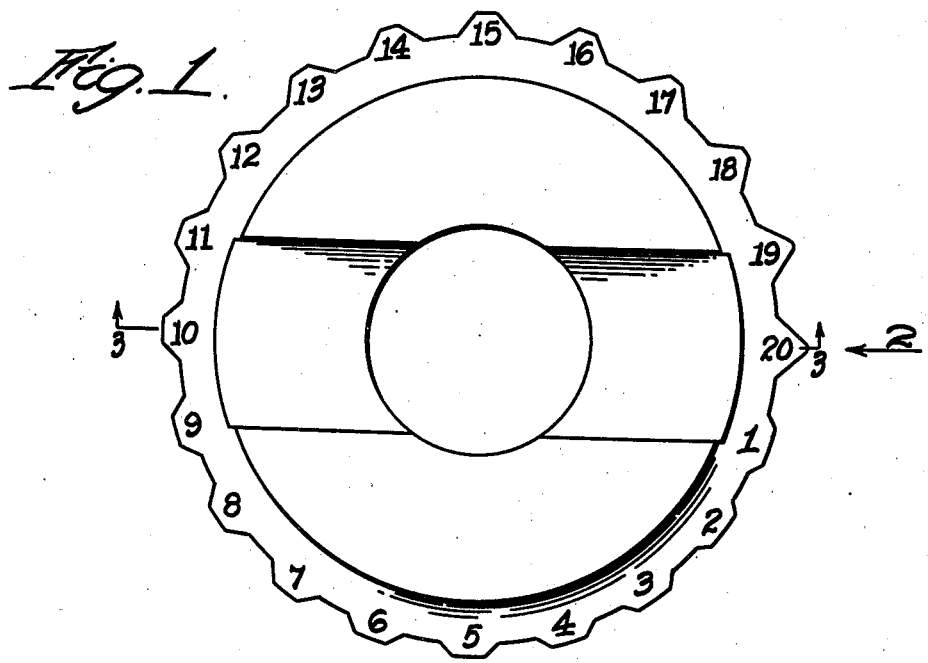
Fig. 1 is a plan view of my improved cutter.
Figure 2:
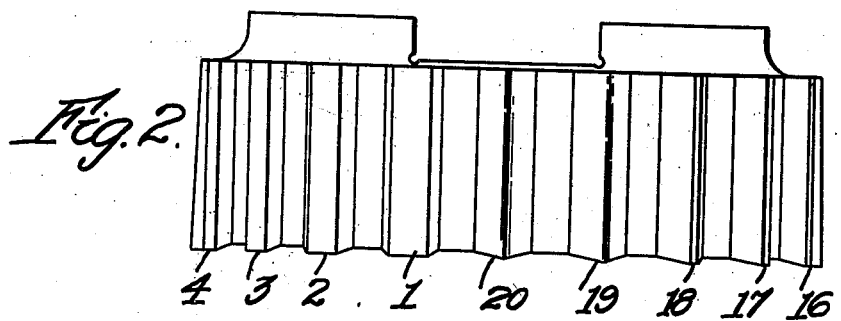
Fig. 2 is a side elevation thereof.

Referring to the drawing, my improved cutter comprises a body portion 10 having an axial opening 11 with an enlarged outer portion 12 and adapted to fit the intermittently advanced cutter spindle of a vertical external broaching machine, which may be of the general type shown in the prior patent to Kenneth C. Monroe, No. 2,198,882, issued April 30, 1940.

As shown in said prior patent, the broaching cutter is vertically reciprocated, and the work is angularly advanced one space after each cutter reciprocation. After the work has thus completed a full revolution, the cutter is advanced angularly one tooth space, and the operation is repeated until each tooth of the cutter in succession has been passed through every groove on the work which separates two adjacent splines or ribs.

If the work is cylindrical, these splines or ribs will have parallel sides, but if the work is frusto-conical, the grooves will have parallel sides and the intervening splines or ribs will have sides which diverge towards the larger end of the work.

My improved cutter is shown herein as provided with a plurality of teeth which are numbered from 1 to 20 respectively in Fig. 1, for convenience in description. All of these teeth spring from the same base circle and the teeth numbered 1 to 18 are active broaching teeth and have substantially the same base width and the same base angles but they increase progressively in height from tooth No. 1 to tooth No. 18. The increase, in an illustrative example, is approximately six thousandths of an inch in height per tooth, or an increase in the radial distance from the center to the end surface of a tooth from 2.389" for tooth No. 1 to 2.495" for tooth No. 18.

The teeth numbered 19 and 20 are sizing and finishing teeth and are very slightly wider than the broaching teeth No. 1 to No. 18 and very slightly higher than broaching teeth No. 18 and perform a final sizing and finishing or reaming operation. In the example shown, the radial distance to the outer end of the teeth No. 19 and No. 20 is 2.500" in a five inch cutter.

Each of the cutting teeth forms a unitary outward projection from the base circle, and the side faces and outer end face of each tooth collectively constitute an external and non-reentrant cutting surface.

Figure 3:
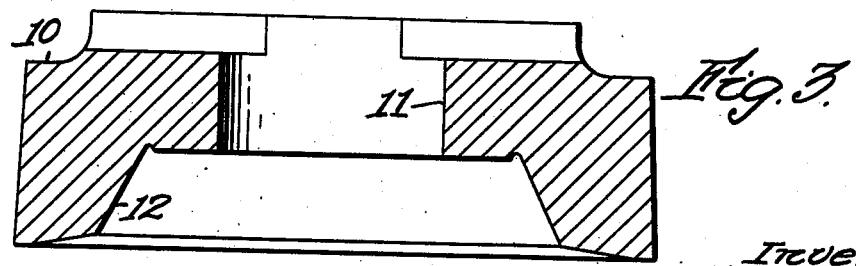
Fig. 3 is a sectional side elevation, taken along the line 3—3 in Fig. 1.

All of the teeth are undercut at the entering or cutting end, shown as 10° in Fig. 3, and are also backed off to provide a slight clearance, shown herein as 1½°.

With this construction, it will be seen that each broaching tooth after the first will follow the cuts made by the No. 1 tooth and will only cut closely adjacent its outer end portion or apex, thus progressively increasing the depth of the cut but without changing the width.

Such a cutter has been found extremely useful in producing splines, ribs or grooves in the external surface of a cylindrical or frusto-conical hub or similar piece of work, where the cut must be extended to a point closely adjacent a projecting shoulder and where, in consequence, the usual milling cutter cannot be used.

Having thus described my invention and the advantages thereof, I do not wish to be limited to the details herein disclosed, otherwise than as set forth in the claim, but what I claim is:

An axially reciprocated circular broaching cutter comprising a body having a substantial peripheral series of axially extended and outwardly projecting end-cutting broaching teeth each formed as a single unitary cutting element, all of said teeth springing from a single cylindrical base surface and all having substantially the same base lengths and the same base angles but increasing progressively in height from tooth to tooth, each tooth having an external and non-reentrant cutting surface which is continuous from base surface to base surface, only one tooth being operative at any one time and each tooth being adapted to operate successively in every cut in the work, and each successive tooth slightly deepening at its apex the cut made by the next preceding tooth.

WILROSE J. PHANEUF.